May 8, 1956     I. L. WILCOX ET AL     2,744,367
BOTTLE CAPPING MACHINE Filed March 27, 1951     13 Sheets-Sheet 1

Fig. 1

INVENTOR.
ISAAC L. WILCOX, NATHANIEL S.
COLE & HERMAN PESCH
BY Bodell & Thompson
ATTORNEYS

Fig. 2

May 8, 1956   I. L. WILCOX ET AL   2,744,367
BOTTLE CAPPING MACHINE
Filed March 27, 1951   13 Sheets-Sheet 4

Fig. 4

INVENTOR.
ISAAC L. WILCOX, NATHANIEL S.
COLE & HERMAN PESCH
BY Bodell & Thompson
ATTORNEYS May 8, 1956 — I. L. WILCOX ET AL — 2,744,367
BOTTLE CAPPING MACHINE
Filed March 27, 1951 — 13 Sheets-Sheet 5

Fig. 5

INVENTOR.
ISAAC L. WILCOX, NATHANIEL S.
COLE & HERMAN PESCH
BY Bodell & Thompson
ATTORNEYS May 8, 1956     I. L. WILCOX ET AL     2,744,367
BOTTLE CAPPING MACHINE
Filed March 27, 1951     13 Sheets-Sheet 7

INVENTOR.
ISAAC L. WILCOX, NATHANIEL S.
COLE & HERMAN PESCH
BY
Bodell & Thompson
ATTORNEYS May 8, 1956   I. L. WILCOX ET AL   2,744,367
BOTTLE CAPPING MACHINE
Filed March 27, 1951   13 Sheets-Sheet 9

INVENTOR.
ISAAC L. WILCOX, NATHANIEL S.
COLE + HERMAN PESCH
BY Bodell + Thompson
ATTORNEYS May 8, 1956     I. L. WILCOX ET AL     2,744,367
BOTTLE CAPPING MACHINE Filed March 27, 1951     13 Sheets-Sheet 10

Fig. 13

INVENTOR.
ISAAC L. WILCOX, NATHANIEL S.
COLE & HERMAN PESCH
BY
Bodell & Thompson
ATTORNEYS

Fig. 14

May 8, 1956  I. L. WILCOX ET AL  2,744,367
BOTTLE CAPPING MACHINE
Filed March 27, 1951   13 Sheets-Sheet 13

INVENTOR.
ISAAC L. WILCOX, NATHANIEL S.
COLE + HERMAN PESCH
BY Bodell + Thompson
ATTORNEYS United States Patent Office 2,744,367
Patented May 8, 1956

2,744,367

BOTTLE CAPPING MACHINE

Isaac L. Wilcox, Fulton, Nathaniel S. Cole, Baldwinsville, and Herman Pesch, Fayetteville, N. Y., assignors to Oswego Falls Corporation, Fulton, N. Y., a corporation of New York Application March 27, 1951, Serial No. 217,783

5 Claims. (Cl. 53—67)

This invention relates to machines for applying caps to bottles and more particularly to applying paper hood caps to the tops of milk bottles.

The invention has as an object the bottle capping machine of the type referred to embodying a compact structure rendering the machine particularly well suited for operation in small dairies.

The invention has as a further object a machine of the type referred to including a cap sealing head readily removable from the machine as a complete unit by operation of a single clamping means.

The invention consists in the novel features and in the combinations and constructions hereinafter set forth and claimed.

In describing this invention, reference is had to the accompanying drawings in which like characters designate corresponding parts in all the views.

The machine consists of a box shaped base section 20 mounted upon four supporting legs 21, as by screws 22, the legs being provided at their lower ends with leveling screws 23. An endless bottle conveyor 24 is mounted on the front side of the machine and is continuously operable to advance a procession of bottles between adjustable guide rails 25 to the right, Figures 1-4, to a bottle transfer station at approximately the center of the front of the machine. The bottles are successively transferred to a bottle advancing turret 26 mounted on the upper end of a shaft 27 journalled vertically in the base section 20. This shaft is intermittently rotated in a clockwise direction, Figures 2 and 4. The turret 26 advances the bottles to a capping station above which there is located a cap sealing head indicated generally at 30, and which is disclosed in detail in Figure 11 of the drawings. The closing head is detachably mounted on an upper framework 32 slidably mounted for vertical movement in uprights 33 extending upwardly from the base section 20, vertical adjustment of the upper framework 32 being effected by a screw 34 having an operating handle 35, the screw threading into a boss portion 36 on the upper framework and being operable to move the framework vertically toward and from the turret 26.

The cap disks 39 are arranged in stack formation in a magazine tube 40 mounted upon and extending upwardly from the upper framework 32. A cap transfer disk 42 is affixed to the lower end of a shaft 43 journalled vertically in the frame 32. The disk 42 is formed with four circumferential spaced apart apertures 45 and with a marginal recess 46 encircling each aperture in the upper side of the disk 42. The recesses 46 are of proper diameter to receive cap disks 39 and the apertures 45 permit the top of a bottle to move upwardly through the disk and move a cap seated in the associated recess 46 into the sealing head.

Figure 5:
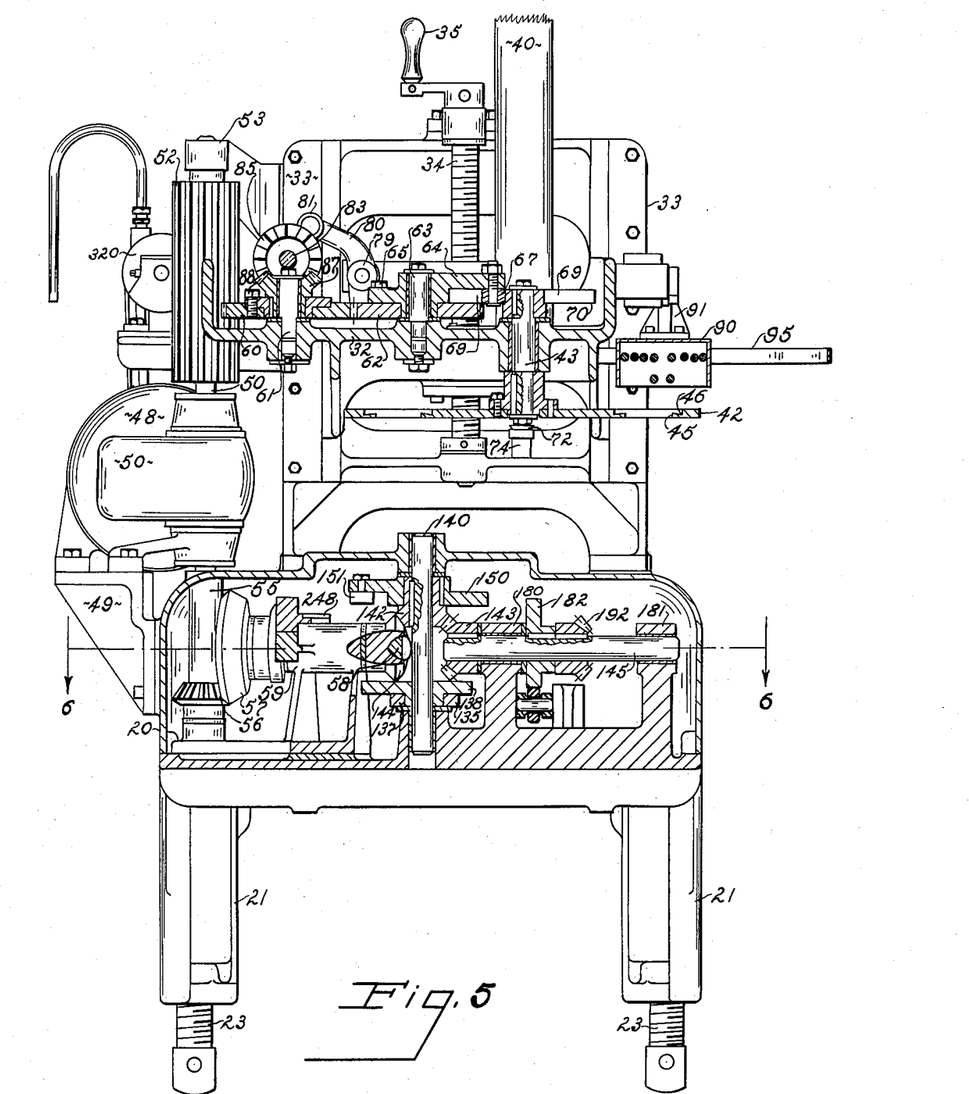
Figure 5 is a vertical sectional view taken on line 5—5, Figure 2.

The machine is operated by a motor 48 mounted on a bracket 49, see Figure 5, secured to the base section 20. The motor includes a housing 50 in which is mounted a gear reducing unit having a vertical output shaft, the upper portion 51 of which carries an elongated pinion 52, the upper end of the shaft being journalled in a bearing bracket 53 attached to one of the uprights 33.

The opposite end of the output shaft of the gear reducing unit 50 extends downwardly into the base 20 and there is affixed to this portion 55 of the shaft a beveled gear 56 arranged in mesh with a gear 57 fixed to a shaft 58 journalled in a bracket 59 mounted in the base.

The pinion 52 is arranged in mesh with a gear 60 journalled on a stud 61 in the frame 32 and arranged in mesh with a spur gear 62 journalled on a stud 63 also mounted in the frame 32. The gear 62 has affixed to its upper surface a crank 64, the crank being adjustably secured to the gear, as by screws 65. The crank 64 has a roller 67 arranged to cooperate with the slots 69 of a Geneva disk 70 affixed to the upper end of the shaft 43. This Geneva drive effects intermittent rotation of the cap carrying disk 42, see Figures 2 and 5.

Figure 1:
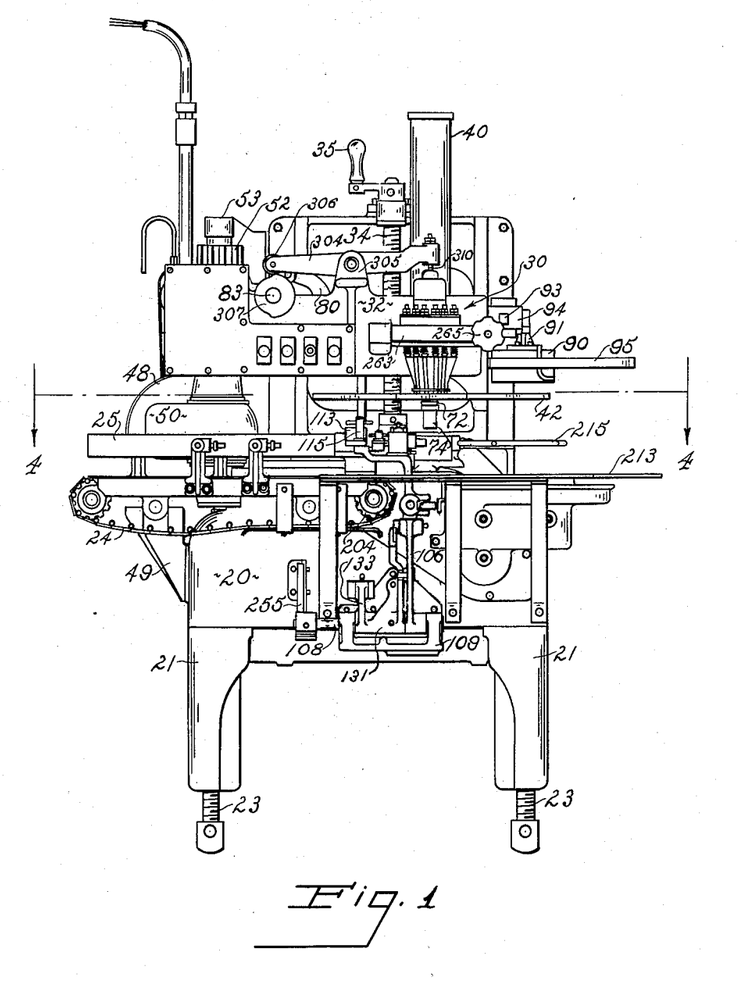
Figure 1 is a front elevational view of a machine embodying our invention.
Figure 2:
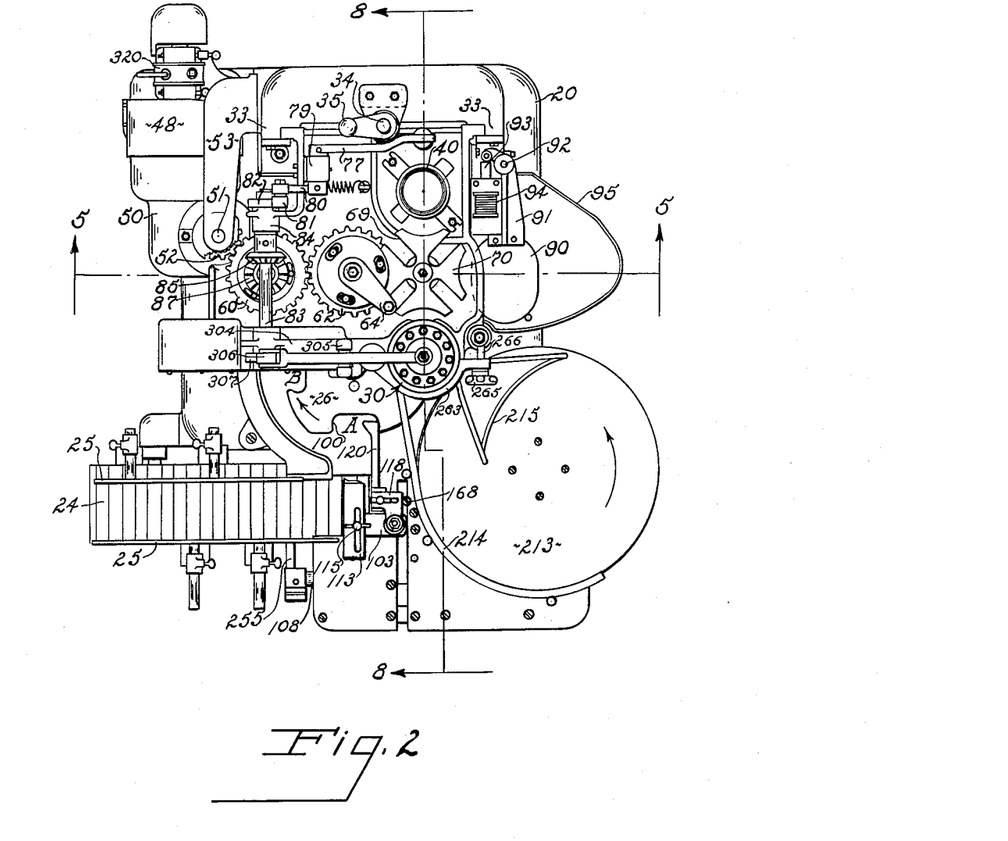
Figure 2 is a top plan view of the machine.
Figure 3:
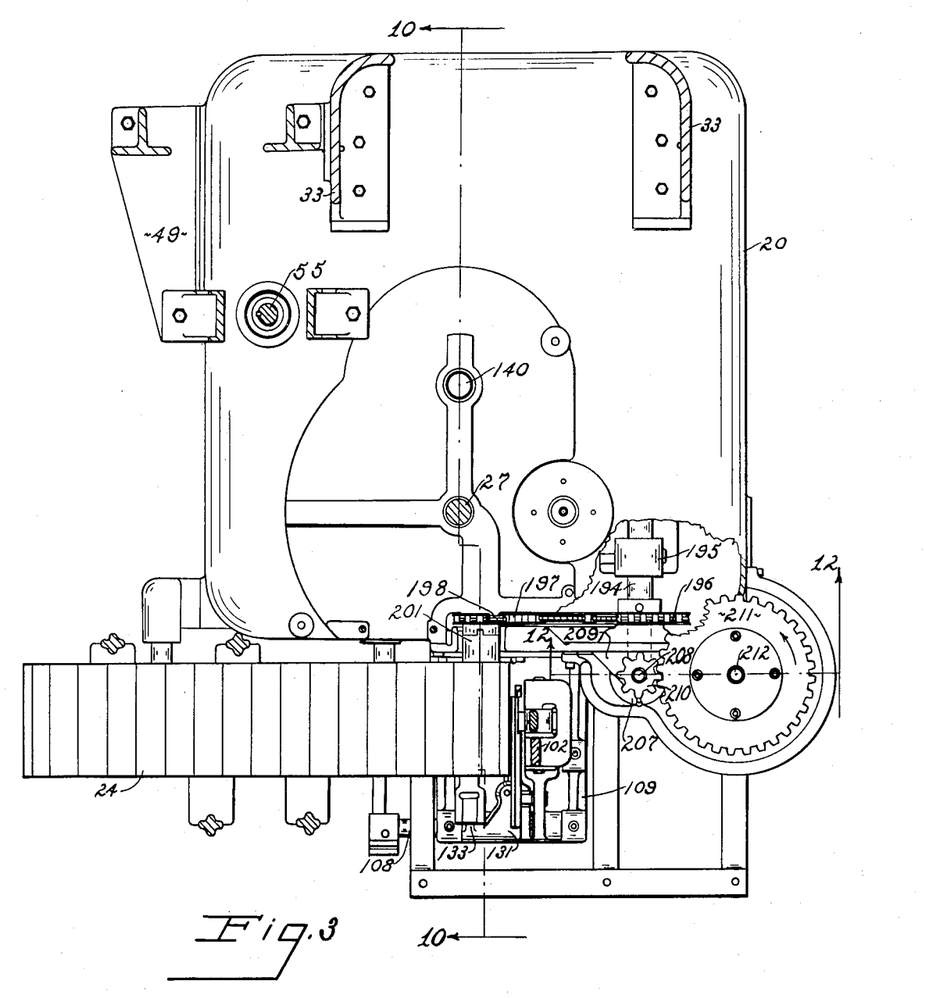
Figure 3 is a top plan view of the base portion of the machine with parts broken away and parts of the frame and bottle transfer shown in section.

The cap disks 39 are successively withdrawn from the bottom of the magazine tube 40 by a cap feeder which consists of a suction cup 72 connected to a hose 73 and carried by an arm 74 fixed to the lower end of a stem 75 slidably mounted for vertical movement in the frame 32. The upper end of the stem 75 is pivotally connected to a link 77 fixed to a shaft 78 journalled in a bearing bracket 79. The opposite end of the shaft is provided with an arm 80 having a roller 81 engaging a cam 82 fixed to a shaft 83 journalled in a bracket 84. The shaft 83 has affixed to it a gear 85 arranged in mesh with a gear 87 adjustably secured to the gear 60 by screws 88. With this mechanism, the suction cup 72 is reciprocated vertically toward and from the bottom of the magazine stack 40. When it is desired to withdraw a cap disk from the magazine, vacuum is applied to the hose 73 as the cup 72 is moved into engagement with the lowermost cap in the magazine and this vacuum is maintained until the cap has been moved downwardly into the recesses 46. It will be apparent that the cap feed 72 is operated in timed relation to the intermittent rotation of the disk 42. The elongated pinion 52 permits vertical adjustment of the top frame structure to accommodate bottles of different heights. As shown in Figure 2, the cap magazine 40 is located on the opposite side of the shaft 43 from the sealing head 30.

After a cap has been withdrawn from the magazine 40, the disk 42 is indexed to position the cap in registration with a cap heater 90 which functions to properly condition the caps for heating the plastic coating thereon to render the same tacky. The oven 90, Figure 2, is carried on a bracket 91 pivotally mounted at 92 and being connected to the rear of the pivot to the movable element 93 of a solenoid 94. This solenoid is energized simultaneously with the motor 48, causing the oven 90 to move inwardly, as shown in Figures 2 and 5, in registration with the recesses 46 in the cap transfer disk 42. If power is shut off to the machine, the oven 90 swings outwardly out of heat exchanging relation with the cap which might, at that time, be positioned under the heater. The heater is enclosed by a suitable guard member 95.

The turret 26 is provided with four bottle receiving recesses 100. During the dwell of the turret, one of these recesses is positioned with a bottle in registration with the cap sealing head 30, and another one of the recesses in registration with the bottle transfer station at the end of the conveyor 24. As each bottle arrives at this station, it is moved inwardly into the bottle receiving recesses 100 of the turret by a bottle transfer mechanism.

Figure 16:
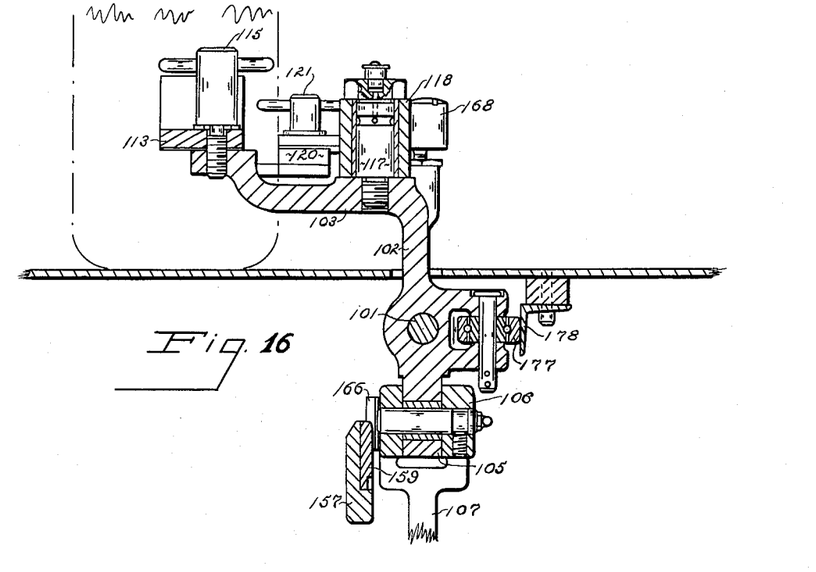
Figure 16 is a sectional view taken on line 16—16, Figure 14.

The bottle transfer consists of a substantially L-shaped casting having a stud 101 extending therethrough, Figure 16. This casting is formed with an upwardly extending portion 102 and a laterally extending portion 103. The lower portion of the member is bifurcated and apertured to receive the stud 101, and these bifurcated portions have depending bosses 105 to which the upper ends of a pair of links 106, 107, are pivotally connected. The lower end of the link 106 is journalled on a shaft 108 which, in turn, is journalled in a bracket 109 attached to the front wall of the base section, as by screws 110. The lower end of the link 107 is pinned on a shaft 112 also journalled in the bracket 109.

A bottle engaging member 113 is mounted upon the outer end of the portion 103. This member is formed with an elongated slot 114 to receive a clamping screw 115 threading into the portion 103, whereby the member 113 may be adjusted toward and from the turret 26. The portion 103 also carries a stud 117 on which there is mounted for rotation an L-shaped member 118 formed with an elongated slot 119 extending parallel to the portion 103. A latch trip in the form of an elongated member 120 is adjustably secured to the portion 118 by screw 121 extending through the slot 119 and threading into the member 120. The member 118 is formed on its under side with a shoulder 122 and the abutting portion of the member 120 is formed with a groove, all whereby the member 120 can be adjusted toward and from the bottle pusher 113 and will be maintained in parallel relation thereto.

Figure 6:
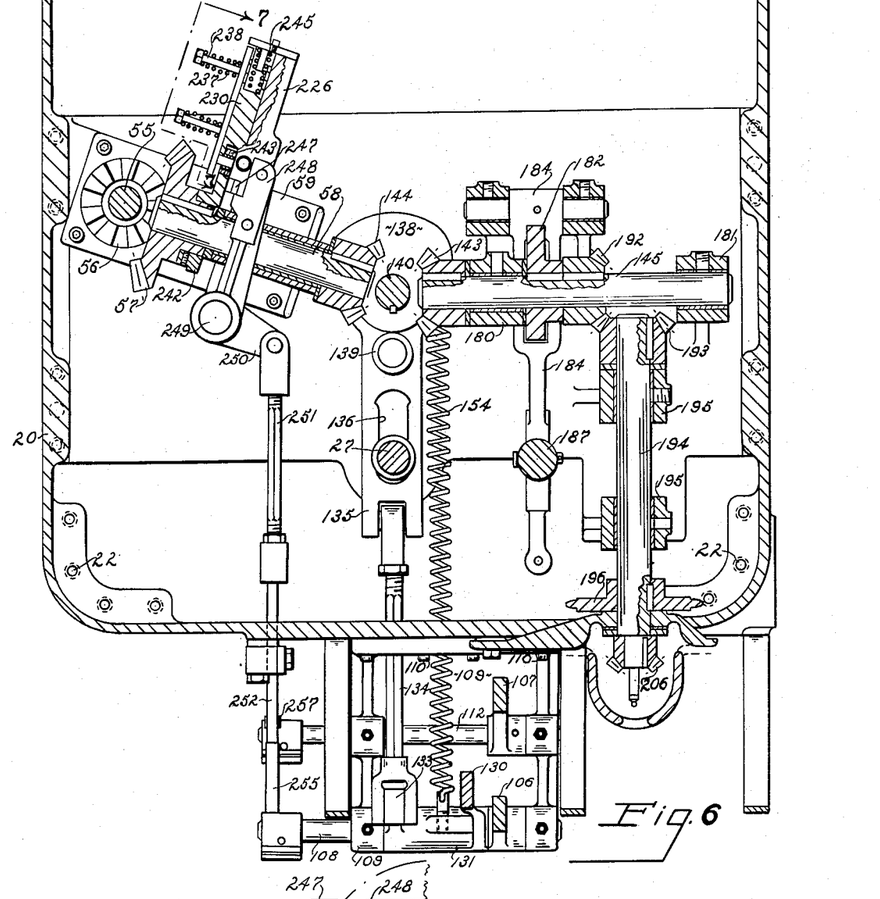
Figure 6 is a transverse sectional view of the base portion taken on a line corresponding to line 6—6, Figure 5.
Figure 10:
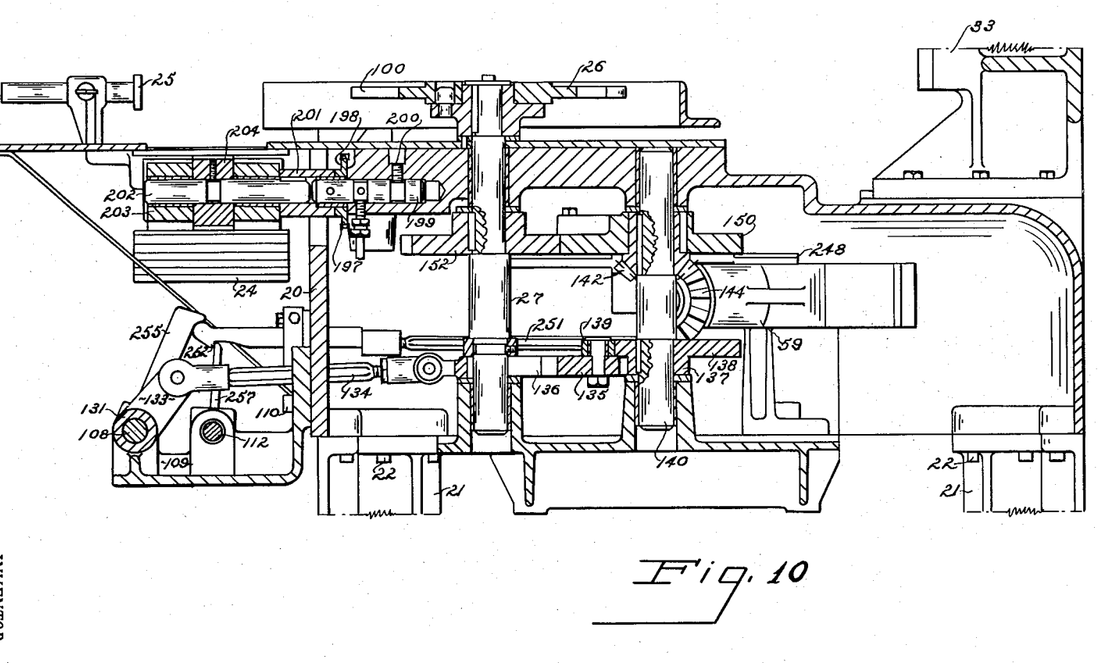
Figure 10 is a vertical sectional view taken on line 10—10, Figure 3.
Figure 15:
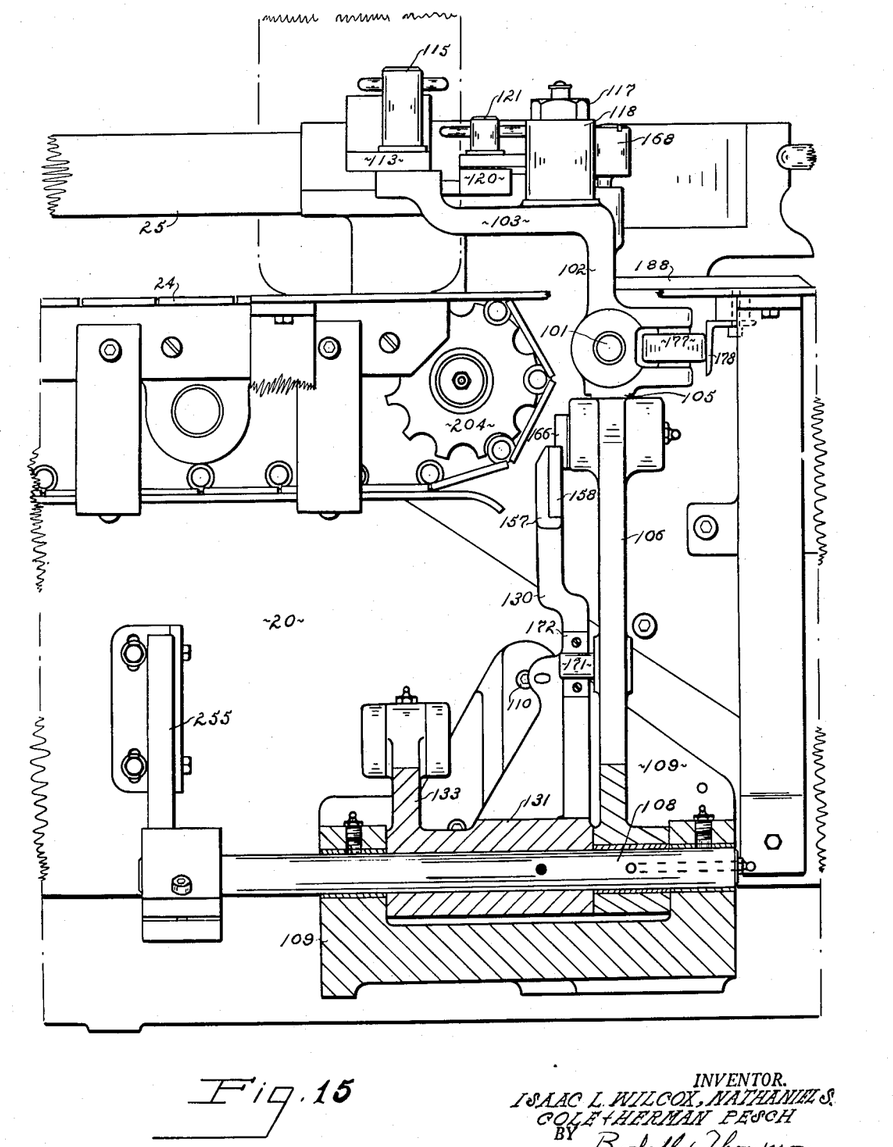
Figure 15 is a front elevational view of the bottle transfer mechanism with the lower portion thereof in section, the view corresponding to line 15—15, Figure 14.

The bottle transfer member is movable transversely across the conveyor 24. In the drawings, it is shown approaching its inner position, the movement of the transfer being sufficient to cause the member 113 to move a bottle into one of the pockets 100 of the turret wheel 26. Reciprocation of the bottle transfer is effected by an actuating member 130 which is in the nature of an arm extending upwardly from a hub portion 131 fixedly secured to the shaft 108 as by being pinned thereto, see Figure 15. The hub portion 131, see Figures 6 and 15, is also provided with a short arm 133 extending upwardly and being connected to a link 134, the inner end of which is adjustably connected to a slide 135 formed with an elongated slot 136 to slidably receive the turret shaft 27. The inner end of the slide 135 is slotted for sliding engagement with the hub portion 137 of a cam 138, and the slide is provided with a roller 139 engaging the periphery of the cam, see Figures 6 and 10.

The cam 138 is fixed to a shaft 140 journalled vertically in the base 20 and carrying a miter gear 142 arranged in mesh with similar gears 143, 144. The gear 144 is mounted on shaft 58. With this arrangement, continuous rotation is imparted to the shaft 140 and a shaft 145 on which the gear 143 is mounted, see Figures 6 and 10.

Figure 14:
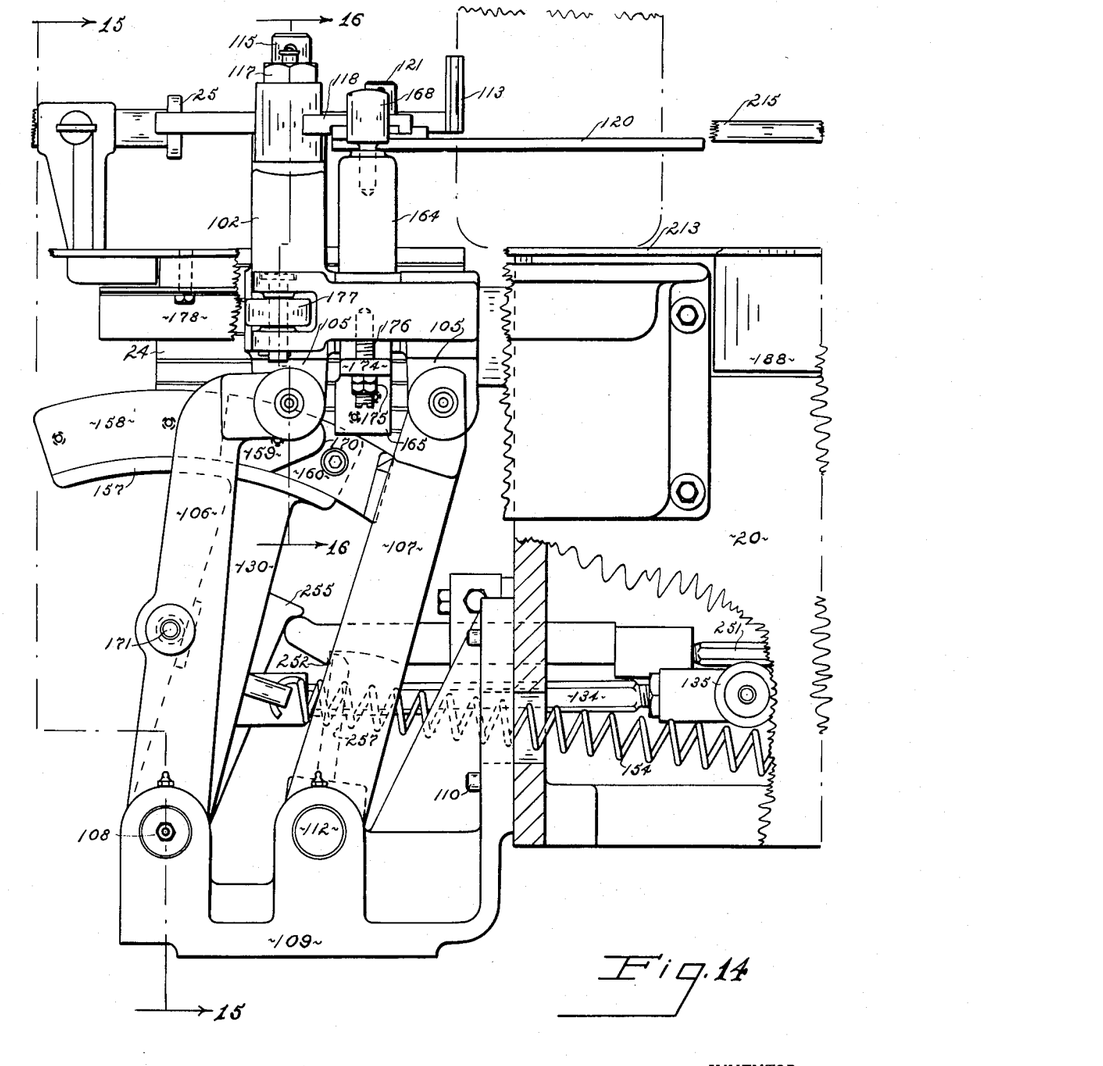
Figure 14 is a view showing the bottle transfer mechanism in end elevation.

The gear 142 has affixed to its hub a crank disk 150 with a roller 151 depending therefrom for engagement with a Geneva disk 152 fixed to the shaft 27, the Geneva drive imparting intermittent rotation to the turret shaft 27. A coiled tension spring 154 is connected between the actuating member 130 and bracket 180 and functions to maintain the roll 139 against the cam 138, causing the actuator to move inwardly toward the turret about the axis of the shaft 108, see Figures 6 and 14. The cam functions to move the actuator outwardly and the reciprocation of the actuator is in timed relation to the bottle turret disk 26, the arrangement being such that when one of the pockets 100 is in registration with the bottle pusher 113, the actuator 130 is moved inwardly.

Figure 17:
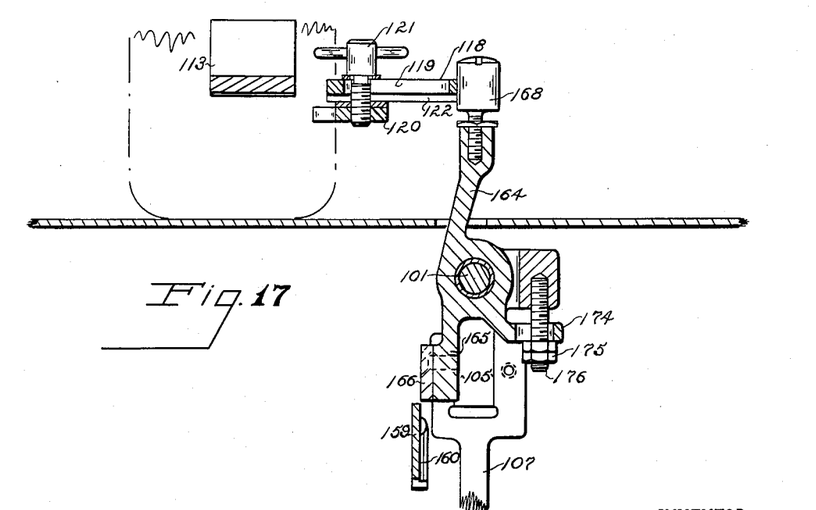
Figure 17 is a view taken on line 17—17, Figure 13.

A latch structure is provided and which functions by the presence of a bottle at the transfer station to latch the member 102 to the actuator 130. The upper end 157 of the actuator 130 is of arcuate formation, see Figure 14, and there is attached to the side of this portion 157, confronting the links 106, 107, wear plates 158, 159. The plate 159 extends inwardly overhanging the arcuate portion 157 and the plate is formed with a recess 160. Mounted on the shaft 101 intermediate the bosses 105 is a member 164 having a portion 165 depending below the shaft 101 and having a wear plate 166 confronting the arcuate portion 157. A screw 168 is threaded into the upper end of the member 164 for engagement by the piece 118 when it is moved about its pivot 117 by a bottle advancing on the conveyor 24 and engaging the member 120. This causes the member 164 to rock in a clockwise direction Figure 17, moving the wear plate 166 to be positioned in the recess 160 and upon the next inward movement of the actuator 130, the outer curved wall 170 of the recess will engage the plate 166, effecting inward movement of the transfer 102 to move the bottle transversely from the conveyor into the turret pocket 100. The link 106 has a laterally extending pin 171 which is engaged by a wear plate 172 fixed to the outer edge of the actuator 130, see Figures 14 and 15. Accordingly, when the actuator moves outwardly, the links 106, 107 and the transfer 102 are moved outwardly, and when the member 120 is moved out of engagement with the bottle, the weight of the member 120 rocks the member 164 in a counter-clockwise direction, moving the wear plate 166 out of engagement with the recess 160. The member 164 accordingly serves as a latch which is movable at the presence of a bottle at the transfer station to latch the transfer to the actuator. Clockwise rotation of the latch is limited by an arm 174 engaging lock nuts 175 carried by the screw 176 threaded into the transfer member, see Figure 17. A roller 177 is journalled on the member 102 of the transfer and engages a guide 178. This arrangement serves to eliminate any binding of the member 102 on stud 101 by an accumulation of bottles on conveyor 24 pressing against the latch trip 120.

Figure 4:
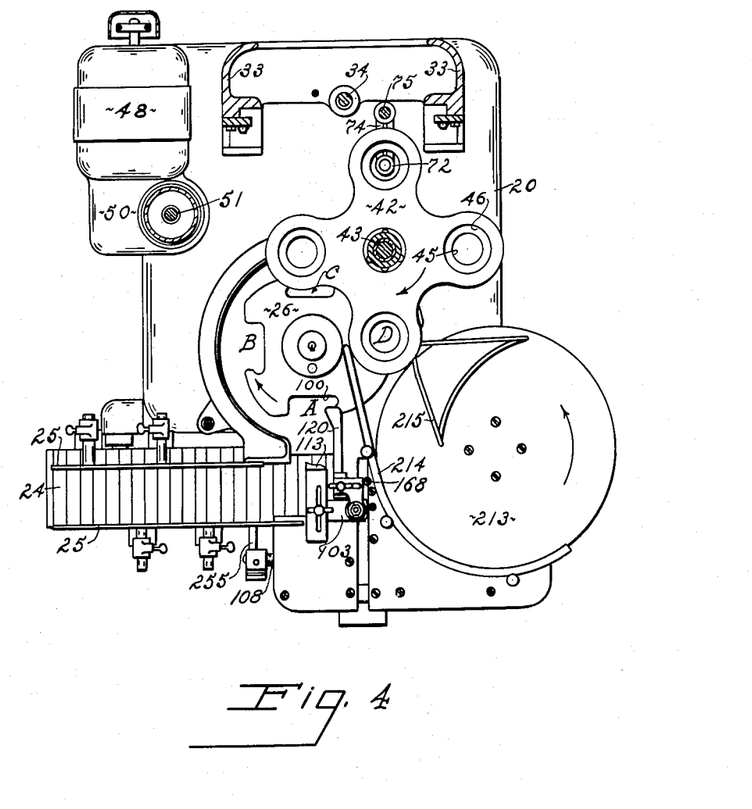
Figure 4 is a view taken on line 4—4, Figure 1.

With a bottle transferred from the conveyor to the bottle turret 26, the turret is indexed to move the bottle from the transfer position A to position B, Figure 4, thence to position C and then to position D where the bottle is elevated for the application of the cap by the sealing head 30. The cap turret disk 42 has advanced the cap to that position at that time.

The shaft 145 is journalled in bearing supports 180, 181, and has affixed to it a cam 182. A lever 184 is pivotally mounted at one end to the bearing support 180 and extends forwardly thereof. The forward portion of the lever is formed with a slot 186 for pivotal connection to a stem 187 mounted for vertical movement in the base section and having a bottle elevating pad 188 connected to its upper end, this pad being located at position D, Figure 4. A coiled tension spring 190 is connected to the forward end of the lever 184 and to the top wall of the base section. This spring effects upward movement of the lever and the bottle elevator 187, 188, and the cam 182 effects downward movement of the lever, see Figure 8. The cam 182 is arranged to permit upward movement of the bottle elevator during the dwell of the turret 26.

The shaft 145 has a second miter gear 192 affixed to it, see Figure 6, and which meshes with a similar gear 193 fixed to the inner end of a shaft 194 journalled transversely in bearing supports 195. A sprocket 196 is fixed to the shaft. A chain 197 is trained over this sprocket and over a sprocket 198 journalled on a stud 199 fixed in the top wall of the base, as by a set screw 200, see Figure 10. The sprocket 198 is connected to a coupling 201 keyed to a shaft 202 journalled in bearing brackets 203 and between which there is mounted on and affixed to the shaft a sprocket or gear 204 and over which the conveyor 24 is trained, this arrangement providing a continuous drive for the conveyor advancing a procession of bottles toward the transfer member.

Figure 12:
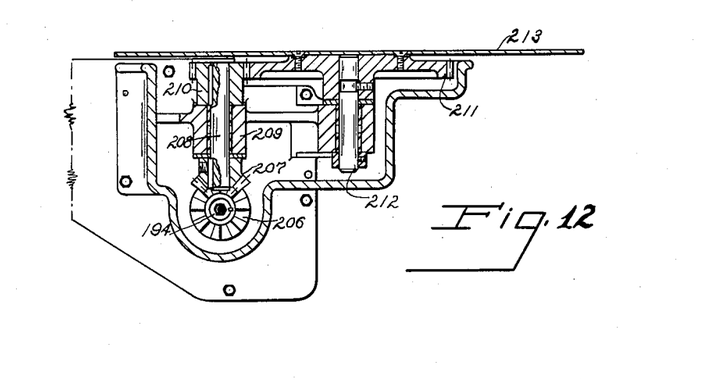
Figure 12 is a sectional view taken on line 12—12, Figure 3.
Figure 13:
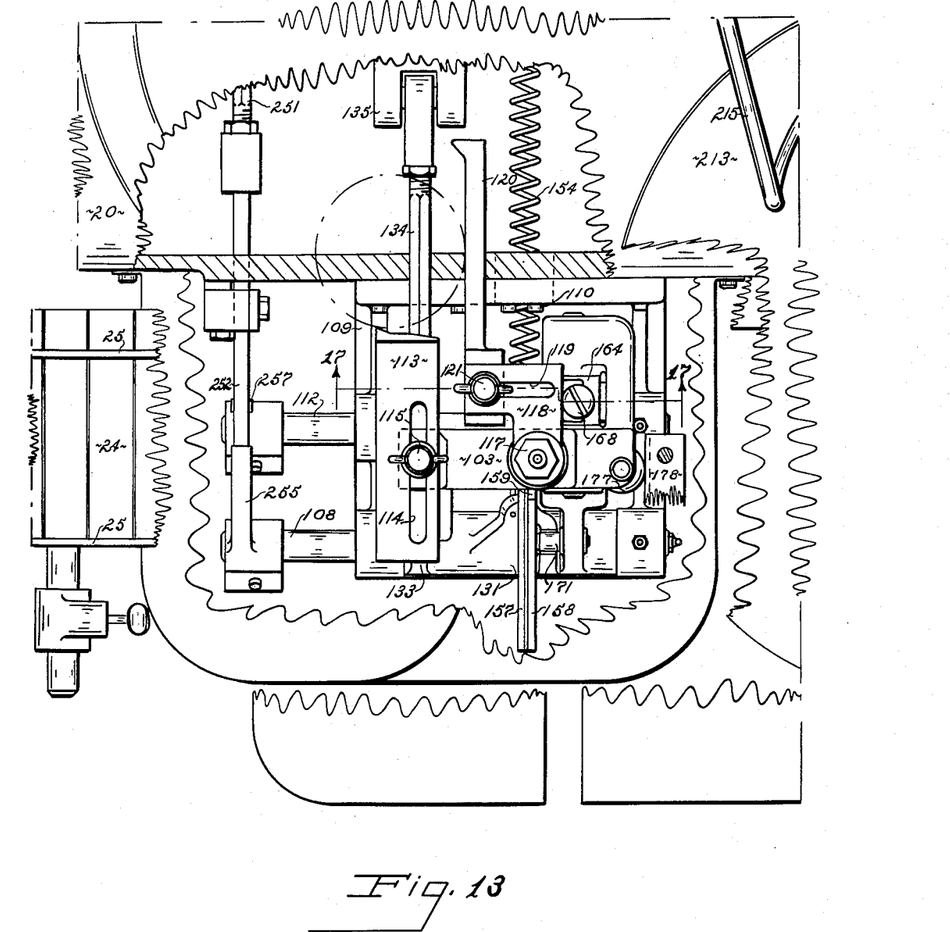
Figure 13 is a top plan view of the base with portions broken away and parts in section showing the bottle transfer mechanism in plan.

The shaft 194 extends through the forward wall of the base and has affixed to its outer end a gear 206, see Figures 6 and 12. This gear meshes with a miter gear 207 fixed on the lower end of a stud shaft 208 journalled vertically in a bearing bracket 209. This shaft has affixed to its upper end a pinion 210 arranged in mesh with a spur gear 211 journalled on the upper end of a stud 212 and carrying a circular disk-like bottle accumulating table 213. Arcuate guards 214, 215 are provided to guide the bottles outwardly from the turret 26 as they leave the cap sealing station D.

Figure 7:
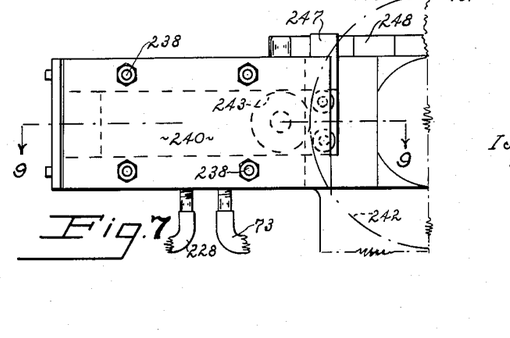
Figure 7 is a side elevational view of the vacuum control valve mechanism indicated by line 7—7, Figure 6.
Figures 8, 9:
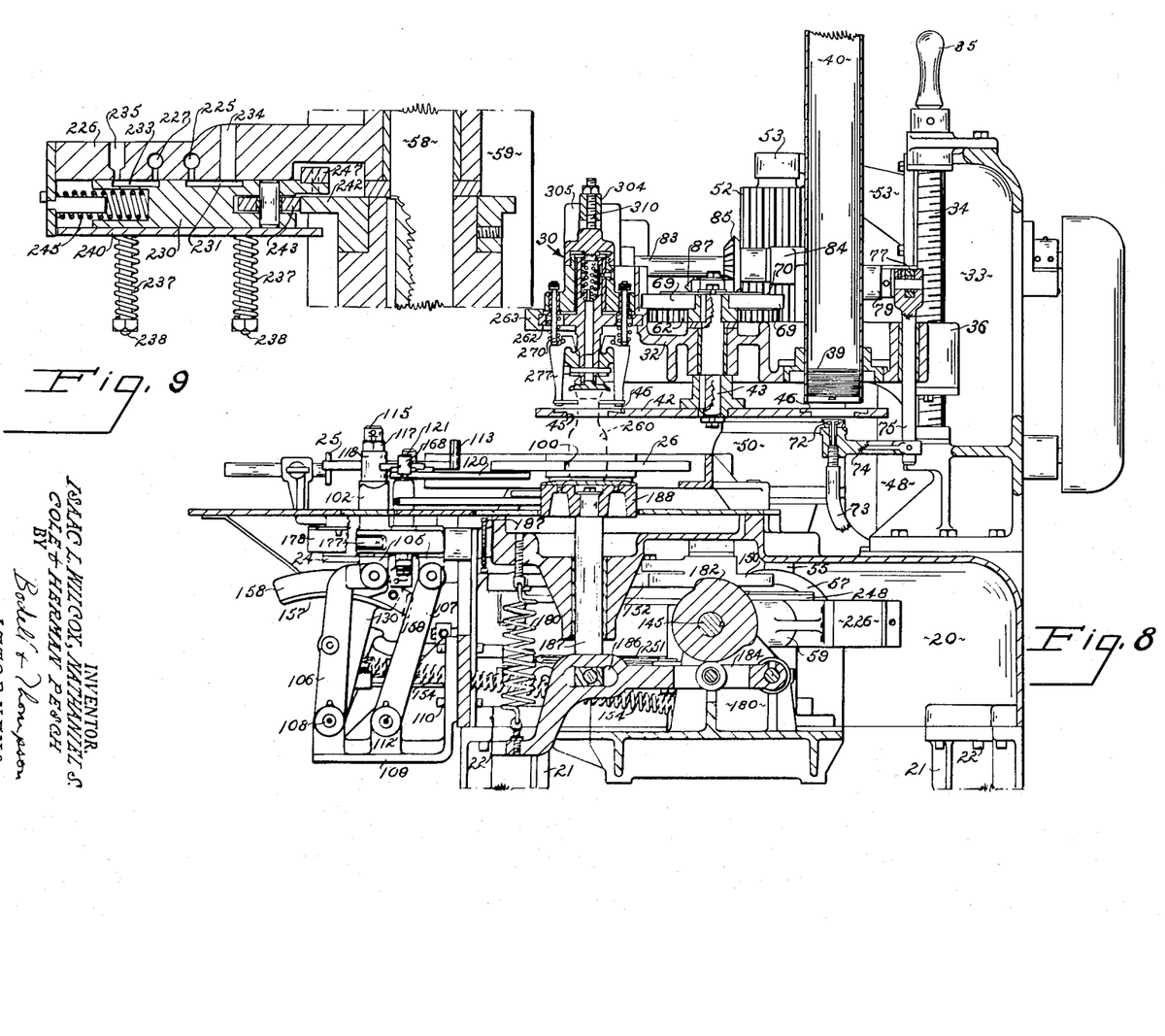
Figure 8 is a vertical sectional view taken on line 8—8, Figure 2.
Figure 9 is a sectional view of the vacuum control valve mechanism taken on line 9—9, Figure 7.

As previously stated, vacuum is applied to the cap transfer suction cup 72 through a hose 73. The hose 73 is connected to a port 225 formed in a valve body 226. A port 227 is connected to a suitable vacuum pump by a hose 228. The ports 225, 227, are alternately connected together and and to atmosphere by a valve member 230 slidably mounted in the body 226. The valve member 230 has elongated recesses 231, 233. With the valve in normal position, as shown in Figure 9, the recess 231 connects the port 225 with atmosphere through a port 234 and the recess 233 connects the port 227 to atmosphere through an aperture 235. The valve member 230 is slidably mounted in a slot formed in the body 226 and is yieldingly maintained in sliding engagement with the bottom wall of this recess in which the ports 225, 227, 234 and 235 are arranged, this being accomplished by coil compression springs 237 mounted on studs 238 extending outwardly from the valve body, the springs acting against a plate 240, see Figures 7 and 9.

The valve body 226 is mounted upon the bearing support 59, Figure 6, and a cam 242 is fixed on the hub of the gear 57. The periphery of this cam is engaged by a roller 243 journalled in the inner end of the valve slide 230, see Figure 9. The valve slide is urged inwardly by a coiled compression spring 245 and the valve is moved outwardly by the cam 242. The valve slide 230 has attached at its inner end a block 247. When the valve slide is moved outwardly by the cam, this block may be engaged by a latch 248 pivotally mounted as at 249 and having an annular arm 250 pivotally connected to a link 251 extending forwardly to the front wall of the base and provided at its outer end with a hook portion 252. The outer end of the link 251 is engaged and moved inwardly by an arm 255 fixed to the shaft 108 and the link 251 is moved outwardly by an arm 257 fixed to the shaft 112. In other words, when the bottle transfer member has been moved inwardly on the arms 106, 107, to transfer a bottle from the conveyor 24 into the turret 26 at position A, Figure 2, the return or outward movement of the bottle transfer member causes the arm 257 to engage the hook 252 and to move the link 251 outwardly, Figure 10, thus causing the latch member 248 to move in a clockwise direction Figure 6, out of engagement with the holding block 247. This releases the slide valve 230 and permits it to follow the cam 242 and move inwardly under the action of spring 245, whereupon the recess 233 connects the ports 225, 227, supplying vacuum to the suction cup 72 of the cap transfer.

The timing of the machine is such that the valve 230 is thus actuated by the cam 242 during the succeeding dwell of the turret 26, that is, while the bottle is at position B, Figure 4. The next two succeeding movements of the turret 26 advance the bottles to the position D and likewise, the next two succeeding movements of the cap carrier 42 advance the cap to position D. Due to the fact that the shaft 108 and arm 255 are continuously oscillated by the link 134, the link 251 will be pushed inwardly, resetting the latch member 248, whereby if there is not another bottle being advanced by the conveyor 24, the vacuum valve will not be permitted to function by the cam 242. However, if the bottles approach in regular spacing on the conveyor 24, the bottle transfer will be actuated by each movement of the link 134 and likewise, the vacuum valve will also be actuated so that each bottle arriving at position D will receive a cap, but if there is a break in the advancement of the bottles on the conveyor 24, there will be a break in the procession of caps from the magazine 40 to the cap carrier 42.

As clearly shown in Figure 8, the cap carrier 42 rotates in a plane slightly below the lower ends of the cap contracting fingers of the closing head 30. When the bottle elevator 188 is elevated, the top of the bottle is moved upwardly through the apertures 45 in the cap carrier, whereupon the top of the bottle moves the cap from the carrier upwardly into the closing head, as shown by dotted outline 260, Figure 8.

Figure 11:
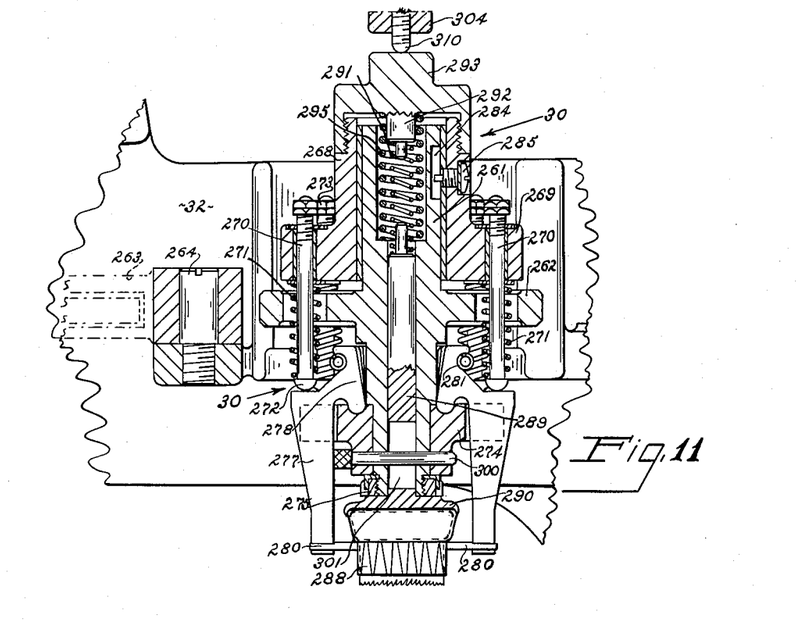
Figure 11 is a vertical, sectional view of the cap sealing head.

The capping head 30 consists of a cylindrical body member 261 formed intermediate its ends with a radially extending flange 262 which is positioned in a semi-circular groove formed in the upper framework of casting 32, see Figure 11. The front half of the flange 262 is encircled by a semi-circular clamp member 263 pivotally mounted at one end on a stud 264 carried by the casing 32. The clamp member 263 is compressed against the flange 262 by a nut 265 threaded on an eye bolt 266 also carried by the frame casting 32. In this manner, the entire closing head unit is quickly and readily demounted from the machine.

A sleeve 268 is slidably mounted upon the upper end of the body 261 and is formed with a radial flange 269 in which are slidably mounted an annular series of pins 270. These pins depend from the flange 269 and are urged downwardly by coil compression springs 271 acting against the flange 269 and the head portions 272 of the pins, downward movement of the pins being limited by jam nuts 273 threaded on the upper ends of the pins, see Figure 11.

A circular casting 274 is positioned on the lower end of the body 261 and is detachably retained thereon by a nut 275 threaded on the lower end of the body. This circular casting 274 is formed with a series of radially extending slots, in each of which there is positioned a cap contracting finger 277. The upper ends of the fingers 277 are formed with portions 278 which extend inwardly toward the body and downwardly, their lower edges being rounded and being positioned in an annular groove in the top side of the member 274. With this arrangement, the fingers 277 are mounted for pivotal movement on the supporting casting 274, such movement causing the lower ends of the fingers, which are provided with cap engaging members 280, to move toward and from the axis of the body 261. The upwardly extending part of the portions 278 are encircled by a garter spring 281, whereby the lower ends 280 of the fingers are normally spread outwardly from the axis of the body. The upper end of the body 261 is formed with a vertically extending slot 284, and the sleeve 268 is provided with a pin or screw 285, the inner end of which is positioned in the slot 284.

With this arrangement, the sleeve is prevented from having rotation on the body. There is a pin 270 positioned directly above each of the fingers 277 so that downward movement of the pins 270 causes pivotal movement of the fingers 277 to move the lower ends 280 inwardly to contract the skirt of the cap 288 about the neck of the bottle.

The body 261 is formed with a central axially extending bore in which there is slidably mounted a stem 289 extending upwardly from a presser pad 290. This stem is yieldingly urged downwardly by a coil compression spring 291 acting against the upper end of the stem, and a plug 292 mounted in a cap 293 threaded upon the upper end of the sleeve 268.

The upper end of the body 261 is formed with an axial counterbore in which there is arranged another coil compression spring 295, the lower end of which acts against the body 261, and the upper end against the cap 293, so that normally the sleeve 268 is positioned upwardly together with the pins 270 carried thereby, and the fingers 277 are spread outwardly at their lower ends.

When the bottle is moved upwardly by the elevator 188, the cap 288 on the top of the bottle engages the presser pad 290 which, at that time, is depending below the ends 280 of the fingers 277, the downward position of the pad being determined by a pin 300 extending transversely through the lower end of the body and the casting 274, the lower portion of the stem 289 being formed with a slot 301 to permit axial movement of the stem and pad relative to the body.

As the bottle is moved upwardly, the cap is securely clamped on the top of the bottle by the presser pad 290 and the skirt of the cap is partially folded downwardly about the top of the bottle by the cap engaging ends 280 of the fingers. When the elevator 188 has reached the top stroke, the sleeve 268 is moved downwardly. This is accomplished by means of a lever 304 pivotally mounted intermediate its ends to a bracket member 305 formed on the upper frame casting 32. One end of the lever is provided with a roller 306 engaging the periphery of a cam 307 mounted on the end of shaft 83. The opposite end of the lever 304 is provided with an adjustable screw 310 which engages the cap 293, this arrangement effecting downward movement of the sleeve 268 and of the pins 270, causing the lower ends of the fingers 277 to swing inwardly toward the axis of the bottle and tightly contract the skirt of the cap, the overlapping portions of which are coated with a substance rendered adhesive while the caps were positioned underneath the heater 90 and which functions to seal the pleats and thus to lock the cap on the top of the bottle.

It will be noted that the fingers 277 are individually pivotally mounted and each is individually actuated by a spring 271. Accordingly, in the event the fingers encounter substantial resistance due to irregularities in the bottle top, the fingers are permitted to yield individually without the exertion of undue pressure which might damage the bottle, or the fingers, and yet each finger effects a proper sealing pressure on the skirt of the cap.

The low portion of the cam 307 permits the sleeve 268 to move upwardly under the influence of the spring 295 and the lower ends of the fingers to move outwardly, whereupon the bottle elevator 188 lowers the capped bottle and upon the next indexing movement of the turret 27, the bottle is engaged by the inner end of the guard 214, Figure 2, and is directed outwardly on the accumulating table 213.

Vacuum is supplied to the vacuum valve structure by a vacuum pump 320 mounted on the motor 48 and driven thereby.

What we claim is:

1. A bottle capping machine, a conveyor operable to advance a procession of bottles to a transfer station, a turret operable to advance bottles successively from said transfer station to and past a cap applying mechanism, a bottle transfer member mounted at said transfer station and being movable transversely of the conveyor toward and from the turret, a transfer actuator, a latch member carried by said transfer and operable upon engagement by a bottle on said conveyor to latch said transfer member to said actuator, and motion transmitting means operable to effect intermittent rotation of the turret and movement of said actuator in timed relation.

2. A bottle capping machine comprising a bottle conveyor operable to advance a procession of bottles to a transfer station, a turret mounted in juxtaposition to said station and being operable to advance bottles successively from said station to a cap applying station, a bottle transfer member, an actuating member, motion transmitting means operable to effect intermittent movement of the turret and said actuating member in timed relation, a latch carried by one of said members and being movable into latching engagement with said other member, a latch trip arranged in juxtaposition to said conveyor for engagement by bottles advancing thereon and being operable upon engagement by a bottle to move said latch into latching engagement.

3. A bottle capping machine comprising a frame, a conveyor operable to advance a procession of bottles to a transfer station, a turret journalled in the frame at one side of the conveyor in juxtaposition to said station, a bottle transfer slidably mounted in the frame on the opposite side of the conveyor for movement transversely thereof to move a bottle from the conveyor to the turret, an actuating member for moving said transfer member transversely of the conveyor, motion transmitting means operable to effect intermittent rotation of said turret and movement of said actuating member in timed relation, a latch carried by the transfer member and having a portion overhanging the conveyor for engagement by bottles arriving at said station and operable upon such engagement to move said latch into engagement with said actuating member.

4. A bottle capping machine comprising a frame, a conveyor operable to advance a procession of bottles to a transfer station, a turret journalled in the frame in juxtaposition to said station, a bottle transfer slidably mounted in the frame for movement transversely of the conveyor toward and from the turret to move a bottle from the conveyor to the turret, a transfer actuating member for moving said transfer, and motion transmitting means operable to effect intermittent rotation of the turret and movement of said actuating member in timed relation, a latch pivotally mounted intermediate its ends to said transfer with the upper portion of said latch overhanging the conveyor for engagement by each bottle arriving at said transfer station, the lower portion of said latch being movable into latching engagement with said actuating member when the upper portion of the latch is engaged by a bottle, said actuating member being operable upon such engagement by the latch to move the transfer member toward the turret and to return the transfer to normal position.

5. A bottle capping machine comprising a turret operable to advance a procession of bottles to and past a cap applying mechanism, a bottle conveyor operable to advance a procession of bottles to a transfer station, a transfer actuating member operable in timed relation to said turret to transfer a bottle on said conveyor to the turret, a latch member operable upon the presence of a bottle at said transfer station to operatively connect said actuating member to said transfer, means for supporting a supply of caps, a cap transfer mechanism operable to transfer caps from said supply to the tops of bottles being advanced by said turret, said cap transfer mechanism including a suction cup, a source of vacuum and a vacuum valve, motion transmitting means operable upon movement of said bottle transfer member to actuate said valve to connect the source of vacuum to said suction cup.

References Cited in the file of this patent

UNITED STATES PATENTS

| | | |
|---|---|---|
| 1,199,516 | Woodland | Sept. 26, 1916 |
| 1,203,676 | Woodland | Nov. 7, 1916 |
| 1,447,984 | Howard | Mar. 13, 1923 |
| 1,502,724 | Howard | July 29, 1924 |
| 1,559,615 | Hoepner | Nov. 3, 1925 |
| 1,585,820 | Baum | May 25, 1926 |
| 2,187,190 | Wilcox | Jan. 16, 1940 |
| 2,196,209 | Glunz | Apr. 9, 1940 |
| 2,227,346 | Holm | Dec. 31, 1940 |
| 2,325,160 | Goodwin | July 27, 1943 |
| 2,574,771 | Zimmerman et al. | Nov. 13, 1951 |